United States Patent [19]
McIver, Jr. et al.
[11] 4,105,917
[45] Aug. 8, 1978

[54] METHOD AND APPARATUS FOR MASS SPECTROMETRIC ANALYSIS AT ULTRA-LOW PRESSURES

[75] Inventors: Robert T. McIver, Jr.; Edward B. Ledford, Jr., both of Irvine, Calif.

[73] Assignee: The Regents of the University of California, Berkeley, Calif.

[21] Appl. No.: 670,767

[22] Filed: Mar. 26, 1976

[51] Int. Cl.[2] .................... B01D 59/44
[52] U.S. Cl. .................... 250/291; 250/292
[58] Field of Search .................... 250/290, 291, 292, 281, 250/282, 423 P

[56] References Cited

U.S. PATENT DOCUMENTS

| | | | |
|---|---|---|---|
| 3,086,111 | 4/1963 | Peper | 250/291 |
| 3,527,939 | 9/1970 | Dawson et al. | 250/292 |
| 3,742,212 | 6/1973 | McIver | 250/291 |
| 3,772,519 | 11/1973 | Levy et al. | 250/423 P |

*Primary Examiner*—Bruce C. Anderson
*Attorney, Agent, or Firm*—Warren T. Jessup

[57] ABSTRACT

A trapped ion cyclotron resonance mass spectrometer comprised of an analyzer cell having upper, lower, side and end electrodes positioned to produce a substantially uniform electric field, a magnet positioned to produce a magnetic field and irradiating wires adjacent to the electrodes for producing an RF alternating field. The upper, lower and side electrodes are in the form of a rectangular hyberbola to produce a homogeneous quadrupolar electrostatic field. Sample ions are produced by reaction with a reagent ion and trapped by the electric and magnetic fields. The magnetic field induces the trapped ions into an orbit at a frequency related to the charge-to-mass ratio. The analyzer cell is then irradiated with an alternating electric field which causes the ions to accelerate until they impinge on the upper and lower electrodes and are collected. An electrometer connected to the upper and lower electrodes senses the collected ions and measures the current produced.

21 Claims, 4 Drawing Figures

METHOD AND APPARATUS FOR MASS SPECTROMETRIC ANALYSIS AT ULTRA-LOW PRESSURES

The government has rights in this invention pursuant to grant No. GP-381710X awarded by the National Science Foundation.

BACKGROUND OF THE INVENTION

This invention relates to mass spectroscopy and more particularly to ion cyclotron resonance spectroscopy.

This invention is an improvement of the method and apparatus for pulsed ion cyclotron resonance disclosed in U.S. Pat. No. 3,742,212, issued June 26, 1973, to Robert T. McIver, Jr., and is incorporated herein by reference. In U.S. Pat. No. 3,742,212, a method and apparatus is described for producing longer trapping periods to improve ion cyclotron resonance spectroscopy. The present invention provides an even greater increase in trapping time allowing storage of ions which permits analysis of samples at ultra-low pressures.

One of the major problems presently confronting mass spectrometry is analysis for low volatility compounds (i.e. compounds requiring ultra-low pressures for vaporization). This problem is especially acute in applications of mass spectrometry to studies of biological importance. In general, biological compounds exhibit high molecular weight, high polarity and the ability to form strong hydrogen bonds. Such compounds have low vapor pressures and sublime (i.e. vaporize) slowly even at elevated temperatures. The traditional approach to this problem has been to chemically derivatize samples in order to enhance volatility. However, chemical modification not only increases the molecular weight, but also is time consuming, difficult, and uncertain, especially when only small samples are available for analysis.

A number of new methods have been introduced recently for the analysis for low volatility compounds. Field desorption mass spectrometry has proved useful for a large number of polar compounds of low volatility. Rapid heating of a sample dispersed on a Teflon surface has been shown to greatly increase the rate of sample evaporation relative to competing surface decomposition reactions. Underivatized oligopeptides have been analyzed in a high pressure chemical ionization source by inserting a solid-sample probe directly in the plasma of reagent ions.

The analytical potential of the ion cyclotron resonance technique has been discussed and considered previously as in the patent referred to above. But despite some initial success in developing specific reagent ions, the scope of investigations has been severely restricted by the limited mass range and the low-mass resolution of the early instruments. Mass ranges have typically been limited to something below 200 to 250 atomic mass units (amu) and severely limited mass resolution beyond unit masses in the 200 amu because the residence time in the cell is relatively short. In addition, negative reagent ion studies under the relatively high pressure ionization conditions of present devices has thus far been almost non-existent.

Most ion cyclotron resonance mass spectrometers presently in existence are magnetic field sweep instruments. This mode of operation requires a high quality electromagnet and associated field sweep controls. Ions of a particular mass-to-charge ratio are detected by a marginal oscillator similar to those used to detect nuclear magnetic resonance. The plates of the analyzer cell are incorporated as capacitive elements in the resonant circuit of the marginal oscillator. When the resonant frequency of the marginal oscillator is equal to the cyclotron frequency of an ion, power is drawn from the resonant circuit as the ion is accelerated. A marginal oscillator is a very sensitive detector, but in spite of its wide use in detecting cyclotron resonance, a number of disadvantages and limitations are apparent. The resonant frequency of a marginal oscillator cannot be scanned conveniently over a wide frequency range. Instruments using a marginal oscillator detector must scan the magnetic field strength in order to trace out a mass spectrum. Electromagnets can be scanned over a wide range, but the rate of scanning is rather slow and the equipment needed for such scans is quite expensive. Another problem is that the mass range is severely limited by the intrinsic sensitivity of a marginal oscillator which is inversely proportional to the mass of the ion detected, and the fact that practical circuits do not perform well below about 75 kHz because of limitations in coil design.

SUMMARY OF THE INVENTION

The purpose of the present invention is to provide an improved mass spectroscope analyzer cell with an improved trapping time which allows analysis of ultra-low vapor pressure compounds.

The present invention is a trapped ion cyclotron resonance mass spectrometer which provides high-mass resolution, high-mass range, and the ability to frequency scan mass spectra at a fixed magnetic field strength. First tests of the system have demonstrated a mass range above 1000 amu and almost an order of magnitude improvement in mass resolution. The invention is embodied in an analyzer cell which permits long trapping times and maintenance of a relatively homogeneous electrostatic field throughout the sample testing. A special configuration of the upper, lower and side electrodes in combination with a constant magnetic field makes the instrument of this invention remarkable for its ability to trap gaseous ions. This feature allows chemical ionization mass spectra to be obtained at ultra-low pressures. In addition, a wide variety of positive and negative reagent ions can be generated by electron impact and allowed to react with vapors of the sample and be analyzed. It is anticipated that samples having vapor pressures as low as $10^{-10}$ Torr can be detected by this method.

The invention employs a rectangular hyperbola configuration for the upper, lower and side electrodes which provides a quadrapolar homogeneous electrostatic field. In addition the RF sweeping of the cell is provided by an RF voltage applied to separate irradiating wires or rods. This allows the use of a constant magnetic field and maintenance of constant voltages on the electrodes to minimize disturbance of the homogeneous electric field providing improved trapping and ejection of sample ions. The upper and lower electrodes are shorted together to improve collection of ions and are connected to an electrometer. Bias voltage is applied to the collecting electrodes by floating the electrometer at the appropriate dc voltage. This configuration improves collection efficiency because both the upper and lower plates or electrodes of the analyzer cell function as ion collector electrodes without disturbing the homogeneity of the electric fields.

The ultra-low pressures used in the analyzer cell are possible because of the increased efficiency in trapping ions because of electrode configuration and separate RF irradiation. Additional advantages are that the low pressures prevent termolecular reactions (ion clustering reactions) and very low sample consumption.

The essence of the invention is a method and apparatus which provides improved ion-trapping efficiency and very long ion resident times by creating a uniform quadrapole electrostatic field with electrodes in the form of a rectangular hyperbola for irradiating the field with a second set of electrodes placed at the asymptotic region of the hyperbolic electrodes and including means for producing a substantially homogeneous magnetic field in the ion cyclotron cell. The invention produces very high mass resolution because of the improved trapping efficiency created by the uniform quadrapole electrostatic fields created throughout the volume of the ion cyclotron resonance mass spectrometer analyzer cell. With this apparatus a chemical ionization method can be practiced in which a sample gas and a reagent gas can be introduced into the cell at ultra-high vacuums with the electrode arrangement described to produce trapped reagent ions which chemically react with neutral sample molecules to form sample ions. The sample ions may be trapped for a relatively long period of time, permitting them to be readily detected allowing the determination of the presence and abundance of a predetermined ion species.

An object of the present invention is to provide a mass spectrometer which is capable of analyzing samples having ultra-low vapor pressures.

Another object of the present invention is to provide a mass spectrometer which improves storage of ions by providing relatively long trapping times.

Another object of the present invention is to provide a mass spectrometer which improves the ability to use negative reagent ions.

Yet another object of the present invention is to provide a mass spectrometer which allows the use of selective reagent ions to ionize particular sample components.

Yet another object of the present invention is to provide a spectrometer permitting the use of a wider variety of reagent ions.

Still another object of the present invention is to provide a mass spectrometer with increased sensitivity by use of an electrometer.

Still another object of the present invention is to provide a mass spectrometer which has improved mass range and mass resolution.

Another object of the present invention is to provide a mass spectrometer which has an improved homogeneous electrostatic field.

Another object of the present invention is to provide a mass spectrometer in which the magnetic field can be maintained substantially constant.

Yet another object of the present invention is to provide a mass spectrometer which can utilize extremely low pressures to inhibit ion clusterion reactions.

Another object of the present invention is to provide a mass spectrometer in which the analyzer cell permits irradiation with a separate RF field.

Another object of this invention is to provide rapid scans over several separate and predetermined regions of the spectrum which provide multiple ion detection capability.

These and other objects of the invention will become apparent from the following detailed description of the invention when considered in conjunction with the accompanying drawings wherein like reference numbers identify like parts throughout.

DETAILED DESCRIPTION OF THE PREFERRED EMBODIMENT

The trapped ion cyclotron resonance mass spectrometer described herein combines a major feature of the omegatron introduced by Hipple, Sommer and Thomas in 1949 Physics Review 76, 1877 (1949) (i.e. electrometer detection of resonant ions) with the ability to trap ions efficiently in the cell for times approaching a minute. The invention combines the sensitivity of the electrometer with other modifications to produce a long trapping time and is similar to the ion trapping analyzer cell originally disclosed in the patent cited hereinbefore.

Figure 1:
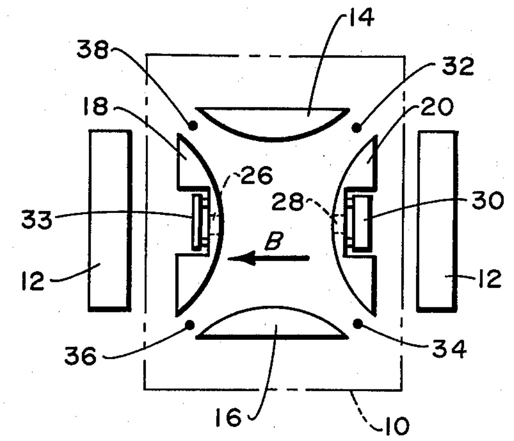
FIG. 1 is a diagrammatical end view illustration of the interior of an analyzer cell with the end electrodes or plates omitted for clarity.
Figure 2:
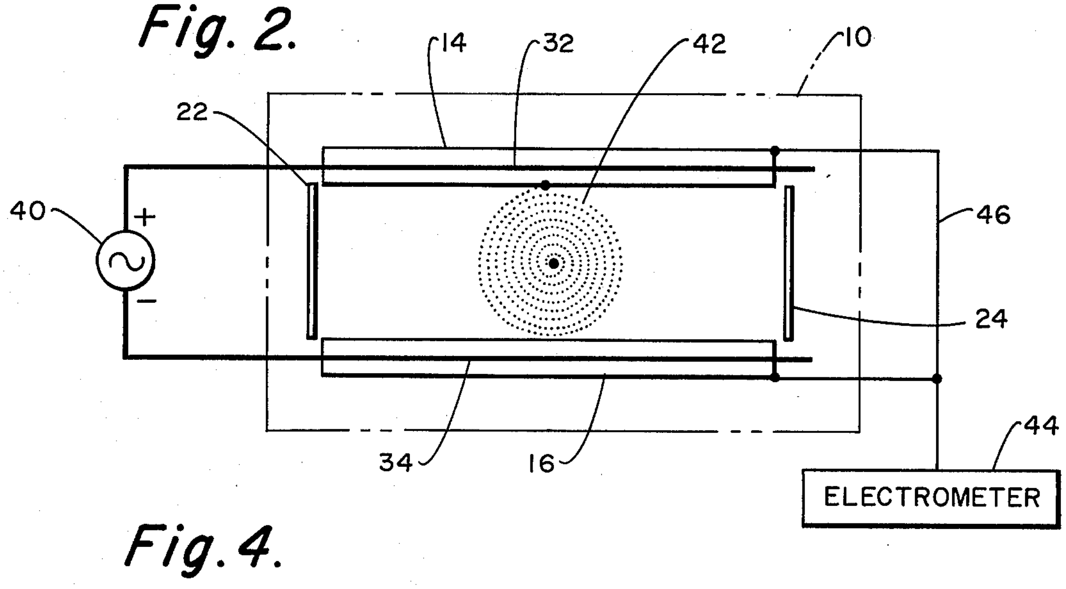
FIG. 2 is a diagrammatical side view illustration of the interior of the analyzer cell with the side electrodes or plates removed for clarity.

FIG. 1 shows the configuration of the analyzer cell 10 used in the trapped ion cyclotron resonance mass spectrometer. The cell 10 is enclosed in a high vacuum stainless steel manifold (not shown) which is placed between the pole caps of a suitable sized electromagnet shown schematically at 12. At a magnetic field strength of 19,000G (Gauss) the homogeneity of the magnetic field is on the order of 1G over the volume of the entire analyzer cell 10. Non-magnetic materials are used for construction of the cell. The upper and lower electrodes 14 and 16, along with side electrodes 18 and 20, are constructed in the form of a rectangular hyperbola as shown. The end plates 22 and 24 (FIG. 2) may be flat. All six electrodes are machined from OFHC copper, plated with silver, and flashed with rhodium. Insulating support rods (not shown) may be made of Vespel, a high-temperature polyimide resin, or a ceramic.

An ionizing beam source, such as an electronic gun, as shown in U.S. Pat. No. 3,742,212, cited previously, may be used which provides electrons which pass through aligned apertures 26 and 28 as usual. High line density silver mesh is placed on the side electrodes in the path of the electron beam in order to screen out electric fields which can penetrate into the cell from the filament of the block and grid 30 and electron collector plate 33. The RF irradiation or alternating electric field for ejection of resonant ions is provided by irradiating wires or rods 32, 34, 36 and 38 which are preferably positioned in the asymptotic region of the hyperbolic electrodes.

The irradiating wires or rods 32, 34, 36 and 38 are energized by an RF oscillator 40 to accelerate resonant ions, causing them to impinge on the upper and/or lower plates 14 and 16. The path of an accelerated resonance ion is schematically shown at 42. Resonant ions impinging on the upper or lower electrodes 14 or 16 are sensed by an electrometer 44.

The trapped ion analyzer cell of the present invention differs from the omegatron, referred to above, and the trapped ion cyclotron mass spectrometer disclosed in U.S. Pat. No. 3,742,212 in a number of respects.

COLLECTION OF THE IONS

The upper and lower electrodes 14, 16 of the trapped ion analyzer cell function as the collector for resonant ions. These electrodes are shorted together internally as shown at 46 and connected directly to an electrometer 44. Bias voltage is applied to the electrodes by floating the electrometer at the appropriate dc voltage. There are two principal advantages of this design: the collection efficiency for resonant ions is greatly improved because both the upper and lower plates of the analyzer cell function as ion collector electrodes; and the homogeneity of the electric fields in the cell is maintained.

HYPERBOLIC ELECTRODES

The upper 14 and lower 16 and two side electrodes 18, 20 of the trapped ion cell 10 are in the form of a rectangular hyperbola. Typically, the separation between the upper and lower electrodes is 1.125 inches, and the separation between the side electrodes is 0.75 inch. Hyperbolic electrodes produce a uniform quadrupolar electrostatic field in the analyzer cell 10.

RF IRRADIATION

In the omegatron, the resonant ions are ejected by applying an RF voltage to the upper plate of the cell; but, in the trapped cell, the radio frequency (RF) voltage is applied to two pairs of wires 32, 34, 36 and 38, running parallel to the long axis of the cell 10. Differential output amplifier or a transformer (indicated at 40) maintain a 180° phase difference in the RF applied to the upper 32, 38 and lower 34, 36 pairs of wires. The wires are placed in the asymptotic region of the hyperbolic electrodes in order to minimize the inhomogeneity of the quadrupolar electrostatic field in the analyzer cell 10.

Double resonance irradiation is an important capability of the ion cyclotron resonance technique which enables the sequence of reactions in a complex reaction mechanism to be elucidated. In our trapped ion cell, the double resonance experiments can be performed using the method known in the art as the ion ejection method. Ions are ejected from the analyzer cell by applying an RF voltage to the side electrodes at a frequency which excites the characteristic oscillatory motion of the ions in the direction parallel to the magnetic field.

ION TRAPPING EFFICIENCY

Figure 3:
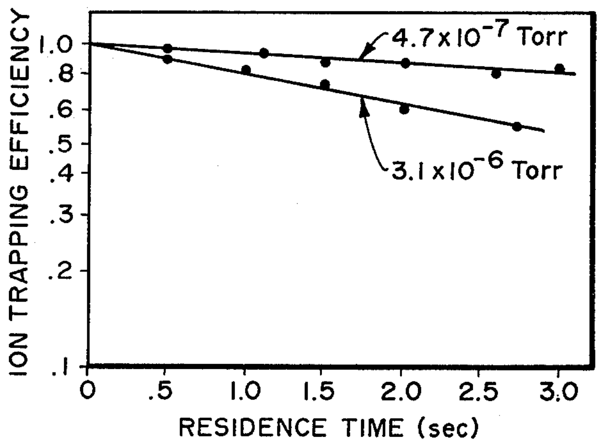
FIG. 3 is a graph illustrating the ion trapping efficiency of the trapped ion analyzer cell.

The residence time for nonresonant ions in the omegatron is only about $10^{-3}$ seconds; but FIG. 3 shows that residence times of several seconds are achievable in the trapped ion analyzer cell. FIG. 3 represents the trapping of benzene ions having a mass-to-charge ratio of $78^{+}$ at a magnetic field strength of 12 kG. It has been determined that the ion trapping efficiency of the trapped ion cell is approximately proportional to the square of the magnetic field strength and inversely proportional to the pressure. Residence times approaching one minute have been observed.

The trapped ion cyclotron resonance mass spectrometer of this invention is particularly well suited for studying chemical reactions between gaseous ions and neutral molecules. The instrument can be operated in either a pulsed or a continuous manner. The pulsed mode of operation is well suited for measuring reaction rate constants. The first pulse in the sequence is a 5 msec duration pulse of the electron beam through the center of the analyzer cell forming primary ions. Ions are trapped by the combination of the magnetic field and an electrostatic potential well established by appropriate dc voltages applied to the six electrodes 14 through 24 of the analyzer cell 10. The magnitude of the dc voltages applied to the six electrodes of the analyzer cell has little effect on its performance or trapping efficiency. For trapping positive ions, one simply sets a voltage of about +1V on the two side electrodes and −1V on the other four electrodes. Negative ions are trapped by reversing the polarity of all the trapping voltages. Trapped ions are allowed to react with neutral molecules for a period of time. The second pulse in the sequence, an RF pulse of about 10 msec duration, ejects ions of a particular charge-to-mass ratio and causes an ion current to register on the electrometer 14. Finally, all the ions, regardless of mass, are rapidly neutralized on the walls of a side electrode 18 or 20 by a quench pulse. By temporarily inverting the polarity of dc voltage applied to one of the side electrodes, the quench pulse destroys the trapping action of the analyzer cell 10. This prevents ions from one pulse sequence from overlapping into the next sequence. The whole cycle is then automatically repeated.

By slowly varying the delay time between the grid pulse and the ejection pulse, one can follow the abundance of a particular mass ion as a function of time. Experiments such as this are useful for kinetic and equilibrium studies of ion-molecule reactions because the time evolution of the system can be monitored. Multiple ions, if present, can be detected by rapid scans over several separate and predetermined regions of the spectrum.

A continuous mode of operating the trapped ion cyclotron resonance mass spectrometer is simpler to build and operate than the pulsed mode. The electron beam is set for a continuous emission of about $10^{-8}$ A, and a continuous radio frequency (RF) voltage is applied to the wires 32, 34, 36, 38. No quench pulse is used. Since the ions can be trapped in the analyzer cell for several seconds, and more, this mode of operation is very useful for low-pressure "chemical ionization" type analytical applications.

The remarkable ability of the trapped ion analyzer cell to trap gaseous ions is due to the form of the electrostatic fields within the cell which is fundamentally different. The end plates 22, 24 of the trapped ion analyzer cell are set at the same dc voltage as the upper and lower plates 14, 16 in order to generate equipotentials which close upon themselves. In the plane perpendicular to the magnetic field, ions are constrained to drift slowly from one end of the analyzer cell to the other. Previous devices such as the omegatron were designed so that the dc voltage on the end plates is the same as on the side plates. The resulting equipotentials enabled ions to drift perpendicular to the magnetic field and to strike the cell plates after a short time.

MASS RESOLUTION

Figure 4:
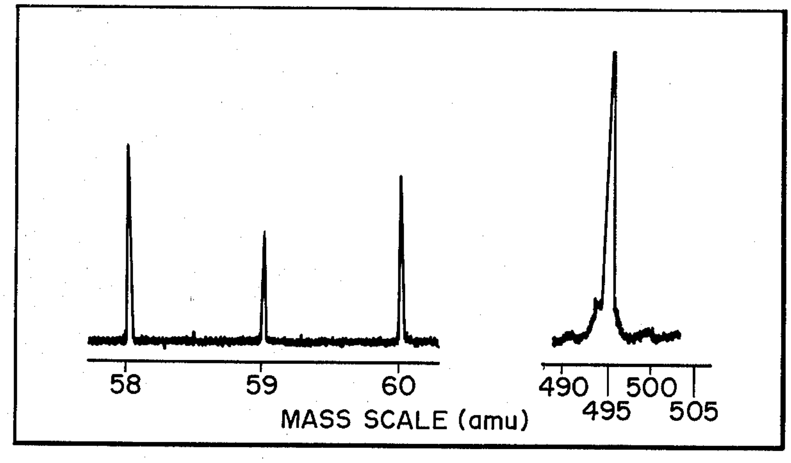
FIG. 4 is a graph illustrating the mass resolution and mass range attainable with the trapped ion analyzer cell.

Mass resolution is defined as $M/\Delta M_{1/2}$, where M is the mass of the ion detected by the mass spectrometer and $\Delta M_{1/2}$ is the full width at half height of the observed signal. High-mass resolution is a desirable characteristic for a mass spectrometer because ions similar in mass can be distinguished. Low-mass resolution above about 50 amu has not been generally possible previously, preventing devices, such as the omegatron, from becoming useful as a general purpose mass spectrometer. In comparison, FIG. 4 shows that the trapped ion analyzer cell has very good mass resolution even up to 500 amu. This greatly improved performance is a direct result of the high ion trapping efficiency of the trapped ion analyzer cell. The maximum length of time that ions can be trapped imposes an upper limit on the attainable mass resolution. For large mass ions, the resolution of the omegatron is limited because the residence time in the cell is only on the order of a few milliseconds. In contrast, the mass resolution of the trapped ion analyzer cell is not limited by this factor because residence times of several seconds and more are routinely obtained.

FIG. 4 shows typical mass spectral traces obtained with the trapped ion analyzer cell at a magnetic field strength of 12 kG. For masses on the order of 50 amu, the full width at half height gives a mass resolution of about 3000, and a resolution of 700 is attained at 495 amu. As with all mass spectrometers, there is some trade-off between resolution and sensitivity. It has been found that factors such as magnetic field homogeneity and frequency stability of the irradiating oscillator can limit mass resolution. The limits imposed by these factors is minimized by the disclosed analyzer cell configuration and operation.

Most ion cyclotron resonance mass spectrometers presently in existence utilize a marginal oscillator circuit to detect the power absorbed by resonant ions rather than the actual ion current, such as the patent cited above. A marginal oscillator is a very sensitive detector but suffers a number of disadvantages and limitations which have prevented the ion cyclotron resonance technique from achieving its full analytical potential. Practical limitations in the design of marginal oscillators have limited the mass range to about 250 amu, and mass resolution is so low that most instruments are unable to resolve unit masses in the 200 amu range. Detection of high-mass ions also is hampered by the fact that the intrinsic sensitivity of a marginal oscillator is inversely proportional to the mass of the ion detected.

There are many advantages of using the electrometer 44 to detect the resonant ions in an ion cyclotron resonance mass spectrometer. The intrinsic sensitivity of the electrometer 44 is independent of the mass of the ion detected, and, as shown above, the mass range of the mass spectrometer is greatly improved. Solid-state electrometers currently available commercially are very reliable and sensitive, and this provides a rugged and inexpensive ion detection system. Mass resolution and ion trapping efficiency increase as the square of the magnetic field strength. In scanning a mass spectrum both of these parameters can be maximized by setting the electromagnet at its peak field strength and sweeping the frequency of the RF voltage. An important feature of the frequency sweep mode of operation involves the rate at which a spectrum can be sampled. Conventional instruments which use a marginal oscillator detector require that the magnetic field strength be scanned rather slowly and smoothly. But frequency scanning (i.e. sweeping) using an electrometer detector permits the possibility of rapid, programmed scans over several separate regions of the mass spectrum. This feature permits detection of multiple ions, if present. The cell can also be step-scanned (i.e. successive application of different frequency RF fields) to search for and detect the presence of particular ions.

One final comparison which can be made concerns problems caused by build-up of sample on the analyzer cell plates. The resolution and sensitivity of previous ICR (ion cyclotron resonance) cells and of magnetic deflection mass spectrometers are adversely affected by adsorption of polar samples on the walls of the system. However, with the trapped ion cyclotron resonance cell, problems of this type have not been encountered, even at ambient temperature with highly polar compounds like water. The explanation for this appears to be that both the three-section ICR drift cell, as shown by Llewellyn in U.S. Pat. No. 3,390,265, and the magnetic deflection mass spectrometers use electric fields to control the speed and direction of the ions. Build-up of charges on the internal surfaces can modify the effective electric fields and alter the motion of the ions. In contrast, the electrostatic fields in the trapped ion analyzer cell serve only to trap the ions, not to steer them, and the build-up of charge on the electrode surfaces does not degrade the trapping action. The absence of ion optics and any electric field controlled drift processes makes the cell exceptionally rugged and reliable.

The trapped ion analyzer cell is particularly useful for studying gas-phase, ion-molecule reactions at ultra-low pressures. For the bimolecular proton-transfer reaction between reagent ions AH+ and sample B, $$AH^+ + B \rightarrow BH^+ + A$$

the extent of conversion of $AH^+$ to $BH^+$ depends upon the pressure of B and the time allowed for the reaction to occur. The long ion residence times available with the trapped ion analyzer cell permit significant extents of conversion to be obtained even when the pressure of the sample is very low. Since ion residence times in the trapped ion analyzer cell are roughly $10^5$ times longer than in a conventional chemical ionization source, sample pressures $10^5$ times lower can be used. All ions generated in the trapped ion analyzer cell are detected because of the large ion collector area, but only about 0.1% of the ions generated in a conventional chemical ionization source are usually extracted for mass analysis.

At the low pressures used for trapped ion cyclotron resonance studies, a wide variety of either positive or negative reagent ions can be utilized because of the absence of termolecular (ion clustering) reactions. Polar reagent gases tend to cluster extensively around sample ions, at pressures of 1 Torr which are used typically in conventional chemical ionization sources. But these termolecular reactions are not generally observed at the ultra-low pressures possible in the trapped ion analyzer cell of this invention.

Sample pressures on the order of $10^{-6}$ Torr were utilized in experiments with the analyzer cell of this invention, but it is of interest to indicate the lowest sample pressure which will give a usable signal. Calculations have indicated a lower limit of $1 \times 10^{-10}$ Torr for the pressure of the sample. This can be compared to a value of $1 \times 10^{-6}$ Torr which is theoretically the minimum sample vapor pressure required for an electron impact mass spectrometer equipped with a direct sample introduction system.

As a direct consequence of the low sample pressures required for operation, the rate of sample consumption is very low. This quantity has been calculated to indicate a sample consumption rate on the order of $5 \times 10^{-11}$ mol/second.

Most analytical applications of ion-molecule reactions have relied upon proton transfer, hydride abstraction, or charge transfer reaction processes. The variety of reagent ions has been rather narrow and limited primarily because of the ion clustering problems encountered at high pressures discussed above. Indications are that the trapped ion cyclotron resonance technique is ideally suited for studying the ion-molecule reactions of a wide variety of reagent ions with complex molecules. At pressures below $10^{-6}$ Torr, a wide variety of positive or negative ions can be generated. Selective use of reagent ions to be specific for various structural and stereochemical aspects of the sample to be analyzed is possible.

Obviously, many modifications and variations of the present invention are possible in the light of the above teachings. It is therefore to be understood that the full scope of the invention is not limited to the details disclosed herein and may be practiced otherwise than is specifically described.

What is claimed is:

1. In an ion cyclotron resonance mass spectrometer analyzer cell in which ions are formed from a sample during an ionizing period the improvement comprising:
- magnetic means for producing a constant, substantially homogeneous magnetic field in said cell;
- a first set of electrodes for producing a quadrupolar electrostatic field in said cell which prevents the escape of ions from said cell in the direction parallel to the magnetic field;
- a second set of electrodes for producing an electrostatic field to prevent the drift of ions out of the ends of the analyzer cell in a direction perpendicular to the magnetic field;
- irradiation means for irradiating said cell with an alternating electric field to excite and accelerate ions of selected mass-to-charge ratios; and
- sensing means for detecting ions which have been selectively accelerated by the alternating electric field.

2. The spectrometer according to claim 1 wherein said electrodes comprise:
- upper, lower, side and end electrodes; and
- said upper, lower and side electrodes are in the form of a rectangular hyperbola.

3. The spectrometer according to claim 2 wherein said sensing means includes collecting electrodes comprised of said upper and lower electrodes electrically connected internally.

4. The spectrometer according to claim 3 wherein said sensing means includes an electrometer.

5. The spectrometer according to claim 2 wherein said irradiating means comprises a plurality of wires adjacent to said upper, lower and side electrodes.

6. The spectrometer according to claim 5 wherein said wires comprise:
- four wires placed in the asymptotic region of the hyperbolic electrodes.

7. A low pressure chemical ionization method of analyzing a sample in a trapped ion analyzer cell by mass spectrometry comprising:
- introducing a reagent gas to the cell at a predetermined pressure in the range of high to ultra-high vacuum;
- introducing a sample gas to the cell;
- ionizing molecules of the reagent gas to form reagent ions;
- trapping said reagent ions inside said trapped ion analyzer cell by subjecting them to a homogeneous magnetic field and a quadrapolar electrostatic field;
- chemically reacting the trapped reagent ions with neutral sample molecules to form sample ions;
- trapping said sample ions inside said trapped ion analyzer cell by subjecting them to the magnetic field and quadrapolar electrostatic field;
- detecting trapped ions, whereby the presence and abundance of a predetermined ion species may be measured.

8. The method according to claim 7 wherein the step of forming reagent ions includes applying a predetermined ionization potential whereby negatively charged reagent ions are formed.

9. The method according to claim 7 including:
- chemically reacting molecules of the reagent gas and reagent ions previously formed from molecules of the reagent gas to form positively charged and/or negatively charged reagent ions with the pressure of the reagent gas being in the range of high to ultra-high vacuum.

10. The method according to claim 7 including:
- chemically reacting reagent ions and molecules of the sample gas to form negatively charged sample ions with the partial pressure of the sample gas being in the region of high vacuum.

11. The method according to claim 7 wherein the step of trapping both reagent ions and sample ions comprises:
- producing a nearly uniform magnetostatic field to cause each ion to move orbitally at a frequency related to the charge to mass ratio;
- producing a quadrupolar electrostatic field to prevent the escape of ions from the analyzer cell in the direction parallel to the magnetic field;
- producing an electrostatic field to prevent the drift of ions out of the ends of the analyzer cell in a direction perpendicular to the magnetic field.

12. The method according to claim 11 wherein the strengh of said magnetostatic field is maintained constant throughout the analysis.

13. The method according to claim 7 wherein said detecting step includes:
- accelerating ions of predetermined mass to charge ratios by exciting their orbital motions in a nearly uniform magnetic field.

14. The method according to claim 13 wherein said accelerating step comprises:
- irradiating the interior of the analyzer cell with an alternating radio frequency electric field separate from the electrostatic and magnetostatic fields used to trap ions.

15. A frequency sweep mass scanning method according to claim 14 wherein said irradiation step includes:
- sweeping the frequency of alternating radio frequency electric field to sequentially excite the orbital motions of trapped ions.

16. The method according to claim 15 wherein the RF irradiation step comprises:
- switching the frequency so as to excite several separate and predetermined regions of the frequency spectrum in steps whereby the presence and abundance of particular multiple ions may be measured.

17. The method according to claim 9 wherein said detecting step includes collecting accelerated ions onto one or more electrodes.

18. The method according to claim 9 wherein said detecting of ions includes the sensing of accelerated ions with an electrometer.

19. The method according to claim 7 wherein the predetermined pressure of the reagent gas is on the order of $10^{-6}$ Torr.

20. The method according to claim 19 wherein the predetermined pressure of the sample gas is on the order of $10^{-8}$ Torr.

21. The method according to claim 7 wherein the step of producing an electrostatic field comprises:

producing a homogeneous quadrupolar electrostatic field.

* * * * *